United States Patent [19]

Carlile et al.

[11] E Re. 30,086

[45] Reissued Aug. 28, 1979

[54] PLASTIC EMULSION FOOD SPREAD

[75] Inventors: Norman J. Carlile, Wirral, England; Theodorus J. Van Selm, Krimpen aan den Ijssel, Netherlands

[73] Assignee: Lever Brothers Company, New York, N.Y.

[21] Appl. No.: 944,048

[22] Filed: Sep. 18, 1978

Related U.S. Patent Documents

Reissue of:

[64] Patent No.: 3,939,282
Issued: Feb. 17, 1976
Appl. No.: 357,750
Filed: May 7, 1973

[30] Foreign Application Priority Data

May 10, 1972 [GB] United Kingdom ..... 21794/72

[51] Int. Cl.[2] ..... A23D 3/00
[52] U.S. Cl. ..... 426/603; 426/607
[58] Field of Search ..... 426/602, 603, 604, 607

[56] References Cited

U.S. PATENT DOCUMENTS

| | | | |
|---|---|---|---|
| 2,185,353 | 1/1940 | Platt | 426/603 |
| 2,874,056 | 2/1959 | Drew | 426/362 |
| 2,928,745 | 3/1960 | Roylance | 426/607 |
| 3,174,868 | 3/1965 | Teasdale | 260/410.7 |
| 3,210,197 | 10/1967 | Galenkamp | 426/607 |
| 3,361,568 | 1/1968 | Kidger | 426/189 |
| 3,488,199 | 1/1970 | Gander | 426/603 |
| 3,494,944 | 2/1970 | Seiden | 426/362 |
| 3,634,100 | 1/1972 | Fondu | 426/607 |
| 3,634,100 | 1/1972 | Paulin | 426/194 |

*Primary Examiner*—Charles N. Hart
*Assistant Examiner*—Ernest G. Therkorn
*Attorney, Agent, or Firm*—James J. Farrell; Melvin H. Kurtz; Ira J. Schultz

[57] ABSTRACT

Margarine and low fat emulsion food spreads have been prepared, the fat phase of which consists essentially of randomized palm oil. The randomization is usually carried out on palm oil alone and enables a substantial amount of palm oil to be incorporated into the fat phase without the onset of excessive post-hardening effects. The randomization also minimizes the amount of expensive vegetable oils such as sunflower oil which have hitherto been found necessary adjuncts with palm oil in such products, particularly in recently-developed soft spreads which can be spread directly at domestic refrigerator temperatures. The major part of the spreads of the invention preferably consist of a fat of melting point 25°-30° C., particularly derived from vegetable oils.

5 Claims, No Drawings

PLASTIC EMULSION FOOD SPREAD

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to margarines and like edible emulsion food spreads of which the fat phase contains palm oil. It is particularly concerned with spreads which are soft enough to be spread at domestic refrigerator temperatures, including those which on account of their low fat contant are in demand in low calory diets. The more stable of these, like margarine, are of the water-in-oil variety and are similarly prepared, by chilling, working and resting the previously prepared emulsion, which may contain additional flavouring, colouring, vitamin and emulsifier components similar to those found in conventional margarine. These combined operations are nowadays carried out in a continuous fashion, in scraped surface heat exchangers of the Votator type and partially crystallise the fat to form a network in which the globules of the aqueous phase are retained, thus stabilising the emulsion against undesirable accretion of the droplets with consequent emulsion breakdown and multiplication of bacterial growth.

Both the oral response developed upon eating margarine and similar fat spread products and the textural response experienced upon spreading them are largely determined by the composition of the fat phase of the product. Great skill, much of it of an empirical nature, is needed to devise the most appropriate fat composition, often a blend of many fats, to meet these needs with economic benefit. In recent times an even more stringent requirement needs to be met for so-called soft margarines and similar spreads which can be spread directly from storage in domestic refrigerators, ie about 5° C. This requirement calls for a particularly flat hardness/temperature response and is a most exacting one to meet.

2. The Prior Art

Palm oil is a cheap and abundant vegetable oil already in widespread use in the Margarine Industry. The limitations imposed upon the amount of palm oil that can be included in margarine and like fat spreads relate to its tendency to confer on fat compositions in which it is incorporated, its own slow crystallising characteristics. This leads to the phenomenon of post-hardening in which a product that is satisfactory in its textural characteristics when it is initially prepared, subsequently hardens on storage to affect both its oral response when it is said to be grainy, and its ability to spread at ambient or lower temperatures.

Interesterification as a technique for modifying the characteristics of palm oil and to admit of its greater use in the Industry is described in "Margarine" 2nd Edition, Andersen and Williams, 1954 page $\frac{8}{3}$-$\frac{1}{3}$ and the general description of the technique is given on pages 54 etc. In this and in other publications however the palm oil is corandomised with a comparable amount of a second oil, either a lauric oil, vide British Pat. No. 874,675, a $C_{16}$–$C_{18}$ vegetable oil in a fat formulation that includes a substantial trans-acid content combined in the triglycerides of the fat composition.

In other references, eg Seiden U.S. Pat. No. 3,353,964, similarly a corandomised blend is disclosed, but between lauric fats and fats of long-chain acids, ie $C_{20}$–$C_{22}$.

Melnick U.S. Pat. No. 2,921,855 describes a corandomised blend, used as a margarine fat, of a triglyceride oil rich in combined polyunsaturated fatty acid, with a highly hydrogenated fat, while Nelson U.S. Pat. No. 2,855,311 discloses the corandomisation of a blend of palm oil with a variety of liquid oils.

In none of these prior disclosures does any suggestion appear that a remedy to overcome the now widely-recognised problem of using palm oil in substantial quantities in emulsion spreads may lie in randomisation essentially of the oil itself, without recourse to the profound changes brought about in modifying the properties of this oil by distributing its own fatty acid moieties among those of other, distinctly different fats.

This invention relates to edible fat compositions such as margarines and shortenings in the preparation of which palm oil is used.

Palm oil is readly available and low in cost among vegetable oils and in several respects appears suitable for the preparation of edible fat products such as margarines and shortenings. Its widespread adoption for these purposes has however been handicapped in the past by its slow rate of crystallisation, with the result that, long after processing has been completed products containing palm oil undergo hardening and suffer other undesirable changes caused by the continued crystallisation of the oil.

It has now been found that margarine products containing substantial quantities of palm oil may be prepared by randomising the palm oil and preparing a fat blend therewith.

Preferably the palm oil is randomised alone, but it may be corandomised with small amounts, not exceeding 10 weight % and preferably less than 5 wt %, of other edible oils or fats, whether of vegetable or animal origin, including marine oil. Similarly, although the palm oil may be modified somewhat by fractionation or other treatment before being randomised, this should essentially impose no major modification upon the inherent characteristics of the fat.

It is indeed an important feature of the invention that the fatty acid composition of the oil remains unchanged, in contrast to the effect of using fractionation methods. Similarly, the glyceride composition of other fats present in the products of the invention remain unchanged, in contrast to corandomisation methods which change the glyceride composition of both the palm and the other corandomised fats. For example, the glyceride components of palm oil may be separated into a high melting stearine fraction and a low melting oleine fraction by subjecting palm oil to fractional crystallisation, the compositions of the fractions differing markedly, to an extent depending upon the conditions of the crystallisation. In accordance with U.S. Pat. No. 3,189,465 an oleine fraction obtained in this way is blended with other fats in margarine formulations. Again, stearine and oleine fractions may be obtained by subjecting palm oil to directed interesterification, carried out under conditions favouring the continued formation of a limited range of glycerides, usually a stearine fraction separated from the liquid phase by carrying out the process at comparatively low temperatures. The stearine and oleine fractions obtained in this way, while again differing markedly from one another, are composed essentially of different combinations of the fatty acids of the oil and thus contain different glycerides from those originally present. The stearine fraction obtained in this way has been proposed for use in shortening compositions.

In both fractionation and directed interesterification methods a substantial proportion of the palm oil is described. The disadvantages described may also be overcome, while utilising whole palm oil, by subjecting it to hydrogenation, but the resultant change in glyceride composition that this brings about leads to unsatisfactory melting characteristics in margarine and similar food spreads by producing a cloying sensation in the mouth due to the presence of higher melting glycerides.

A further advantage of the invention is that no other fat need by involved in the interesterification. This again provides substantial economies and permits the use, in blends with the randomised palm oil, of other fats in proportions providing optimum melting characteristics whose own melting characteristics are unmodified by corandomisation with the palm oil. The cool-melting characteristics of lauric fats for example, which may be present in the products of the invention are accordingly retained, since they are blended instead of being corandomised with palm oil in accordance with earlier proposals.

The invention is particularly useful in the preparation of margarine and like emulsion fat spreads, which are often required to meet rigid product specifications, especially as to their melting and hardness characteristics. In particular, the so-called soft margarines now in vogue are required to remain easily spreadable, as table margarines, at domestic refrigerator temperatures, ie about 5° C., while yet being of plastic consistency at ambient temperatures, which may be as high as 20° C. These requirements imply a flat response to temperature of hardness value. If this is measured in accordance with the penetration method of Haighton, then a soft margarine may be described as one having the penetration range from $C_4$ less than 900 g/cm$^2$ and particularly less than 750 g/cm$^2$, to $C_{20}$ between 50 and 150 g/cm$^2$ according to the time of year. A very small amount of whole or modified palm oil is permissible in soft spreads, at most about 10 wt % beyond which the product tends to unacceptable hardness.

The invention is particularly suitable for the preparation of fat blends for soft margarines, meeting the above requirements for hardness values with as much as 40 wt %, in contrast to conventional formulations in which not more than 25 wt % is practical in spread formulations, many of which nevertheless fail to meet the above-stated requirements for soft spreads, unless a substantial quantity, often as much as 40 wt % or even more, of an expensive liquid vegetable oil, for example sunflower oil, is also present. A particular advantage in the invention is that not only is less oil of this kind necessary, but it may be totally replaced by cheaper oils, for example soybean oil. Preferably the fat compositions of the invention contain from 15 to 300 wt % palm oil, preferably about 20–25 wt %. The dilatation values of palm oil increase with randomisation, and amounts in excess of 40 wt % are therefore less desirable.

In additon to meeting the above penetration characteristics, the fat component of soft spreads is also required, for good consumer response to fulfill palatability requirements provided by melting characteristics thay may be expressed by dilatation values measured in the manner described in J. Am. Oil Chem. Soc. (1954) 31, pp. 98–103. These should lie between about $D_5=600$ and $D_{35}$ below 50. These requirements are met largely by an appropriate choice of fats or oils with which the randomised palm is blended, and hardness also by adjustment of the conditions under which the fat emulsion is processed. In accordance with contemporary practice, the spreads of the present invention are preferably prepared from an emulsion of an aqueous phase in the fat phase, followed by chilling and working the composition to crystallise the fat, in "Votator" equipment including a scraped surface heat exchange chiller. Other things being equal, greater amounts of palm oil may be incorporated using longer residence times in the Votator.

In addition to palm oil, the fat blends of the invention may include a variety of other components. A proportion of unrandomised palm oil may for example be present, but this should desirably not exceed 10%, since it induces post-processing hardening during the shelf-life of the spread, particularly within a few hours of manufacture. Similarly the presence of unrandomised hardened palm or palm fraction should not exceed 10 wt %.

Other semi-solid fats of the palmitic variety, eg cottonseed oil, may be included in similar quantities and lauric fats, eg palm kernel oil, babassu and coconut oils and their fractions, are all suitable components. Several animal fats rich in palmitic acid are also suitable, eg lard and tallow; others include marine oils, for example herring and sardine oils, although these in 10% with general practice may require hardening treatment by hydrogenation to confer flavour stability. Again, however, preferably not more than 10% and particularly not more than 5% by weight of these fats should be present in the fat composition.

The major part, ie more than 50 wt % of the fat component of the spreads according to the invention is composed of vegetable oils which at ambient temperatures, ie 15° C. are liquid, or which are lightly hydrogenated to a melting point of 15°–30° C. These comprise for example corn, groundnut, safflower, sunflower, sesame and soybean oil. The latter in particular, being cheap is preferred. In keeping with widespread practice, it is preferably hydrogenated at least in part to stabilise the oil against deterioration, although the oil may remain largely unsaturated with an Iodine Value of 90 or more. Besides meeting the requirement for producing soft, palatable spreads, the choice as well as the amount of liquid oil is preferably governed by the widely accepted desirability of incorporating within the composition glycerides of the polyunsaturated, so-called essential acids. Preferably the fat compositions of the invention consist of randomised palm oil and a fat or fat blend having a melting point of 25°–30° C. In this specification the melting point of a fat means the temperature at which the fat becomes wholly melted, shown by slowly heating the fat until it turns clear.

It will be understood that the inveniton may be applied in the preparation of margarine and of other spreads having a lower fat content than is required in margarine. These so-called low fat spreads may contain as little as 40 wt % fat. The invention is also applicable to shortening compositions in which whole randomised palm oil is blended.

EXAMPLE 1

A margarine fat was prepared by blending various components in the following amounts of weight:

| | |
|---|---|
| Soybean Oil | 18 |
| Hardened Soybean Oil | 57 (53% slip m.pt. 28° C. I.V.-105) ( 4% slip m.pt. 36° C. I.V.- 50) |
| Interesterified Palm Oil | 21 |
| Hardened Palm Oil | 4 (Slip m.pt. 45° C. I.V.-45) |

A margarine emulsion was prepared by .agitating the fat at 40° C. in a mixture with 16% of an aqueous phase comprising tap water and 0.5 wt % of lecithin and 0.1 wt % based on the fat in the fat phase of a partial glyceride emulsifier and flavouring agents, vitamins, colouring matter and salt in customary amounts.

The water-in-oil emulsion formed was supplied continuously at about 80 kg/hr to the first of series of three scraped surface chillers, each 5 cm in diameter, 25.5 cms in length and having a chilling surface of 0.04 $m^2$. Between the first or second pair a pre-crystalliser was interposed, comprising a vessel 3 liters in capacity and also equipped with a close-fitting agitator but with no chilling capacity. No material difference was observed between the two pre-crystallizer positions. A post-crystalliser of similar construction to the pre-crystalliser but half the size, followed the third chiller unit. The equipment substantially reproduced on a smaller scale the effect and operation of a full-size margarine plant. Residence time in the crystallisers was 3 minutes.

The chilled emulsion emerged from the first chiller at about 17.5° C. and gained about 1° C. in the pre-crystalliser, emerging at 16° C. and 14° C. from the second and third chiller units and finally at 18°-20° C. from the post-crystalliser, from which it was pour-filled into standard 250 gm tubs.

After storage for 3 days at 15° C. and a day at the test temperatures the product was tested for hardness. Dilatation values of the fat were also obtained. The results of the tests are given in Table I.

TABLE I

| Temp. °C. | Hardness (C values) | Dilatation |
|---|---|---|
| 5 | 655 (617) | 475 |
| 10 | 332 (344) | 425 |
| 15 | 106 (125) | 340 |
| 20 | 132 (144) | 250 |
| 35 | — | 50 |
| 40 | — | 10 |

The product was of pleasing texture at temperatures from 5° to 20° C., in which range it remained plastic and could be readily spread. It melted quickly and readily on the tongue. The melting point of the fat was 33.3° C.

The experiment was repeated at twice throughput (1½ minutes' residence time) while maintaining the same temperature profile and agitator speed. The corresponding characteristics of the product are given in Table I in brackets.

A series of three comparative trials was carried out based on fat compositions containing the same ingredients, except for the substitution of the randomised palm oil by unrandomised palm oils in the amounts 15, 21 and 25 wt %, the amounts of the remaining ingredients being adjusted as little as possible, to obtain similar dilatation values at 5°, 10°, 15°, 20°, 25° and 30° C. These varied less than 10% of the arithmetic mean of the four compositions and at 35° C. the values were 35, 35 25 and 55. Nevertheless, the hardened palm and soybean oil content remained unchanged and the amount of soybean oil was changed only comparatively slightly.

The melting points of the comparative fat compositions varied from 31.5° to 33.5° C. None of the margarine products from these trials however, although prepared under the same conditions as before, showed in hardness tests a $C_5$ value less than 700 and a $C_{20}$ value within the range 50–150, nor could these be obtained by adjustments to the equipment in which the emulsions were worked. In only one example was the $C_5$ value less than 900 and most were well above 1,000. Similarly, the majority of the $C_{20}$ values were above 150.

EXAMPLE 2

A low fat table spread was prepared from an emulsion consisting of 40 wt % fat phase in which 60 wt % aqueous phase was dispersed, conventional margarine additives including colouring matter and emulsifiers being included. The emulsifier was chilled, worked and rested in a series of Votator A and B units including a precrystalliser unit in which a portion of the processed emulsion containing crystallised fat was recirculated to mix with a fresh emulsion.

The fat phase contained by weight the equal parts of refined randomised palm oil and soybean oil, and half as much coconut oil. In different products 25% or 50% of the soybean oil was first selectively hardened to a fall of about 25 Iodine Value units to improve flavour stability.

Samples of all the products exhibited satisfactory hardness and dilation characteristics, after storage for several weeks at 10° and 20° C., for a soft spread, ie hardness at 5° and 20° C. below 900 and 50–100 and dilatations at 5° and 35° C. about 600 and below 50.

A comparable product with corresponding characteristics was made using a fat phase almost ⅓ of which consisted of palm kernel oil and more than 40% of sunflower oil. It contained in addition only 10% soybean oil. Not more than 15% non-randomised palm oil could be included, part of which was selectively hardened to give better dilatation characteristics.

What is claimed is:

1. A plastic emulsion food spread comprising an aqueous phase and a fat phase in the form of an emulsion in which the fat phase is partly crystallized and comprises by weight of the fat phase, from about 5% to about 40% of a triglyceride composition, the fatty acid residues of which are in random distribution and consist essentially of the acid residues of palm oil, and a major proportion of an additional fat where said fat is selected from the group consisting of corn, cottonseed, groundnut, safflower, sunflower, sesame and soybean oils.

2. A food spread according to claim 1 which contains from about 15 to about 30 wt % palm oil, based on total fat phase.

3. A food spread according to claim 1 wherein said spread is in soft tub form, having a penetration range from $C_5$ less than 900 grams $cm^2$ to $C_{20}$ between 50 and 150 grams $cm^2$.

4. A food spread according to claim 1 wherein said spread comprises a low fat spread containing by weight of the spread a major proportion of aqueous phase dispersed in a minor proportion of fat phase.

5. A method of preparing a water-in-oil emulsion food spread having an enhanced palm oil content, comprising dispersing an aqueous phase in a fat phase to form an emulsion and chilling, working and resting the emulsion to crystallize at least part of the fat phase, wherein the fat phase is prepared by randomizing palm oil and blending, by weight of said fat phase, from about 5 to about 40% of said palm oil with a major proportion of an additional vegetable oil selected from the group consisting of corn, cottonseed, groundnut, safflower, sunflower, sesame and soybean oils.

* * * * *